United States Patent
Hosaka et al.

(10) Patent No.: US 9,982,149 B2
(45) Date of Patent: May 29, 2018

(54) VISCOSITY MODIFIER COMPOSITION

(71) Applicant: ADEKA CORPORATION, Tokyo (JP)

(72) Inventors: Masaki Hosaka, Tokyo (JP); Takashi Ono, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 181 days.

(21) Appl. No.: 15/115,417

(22) PCT Filed: Feb. 2, 2015

(86) PCT No.: PCT/JP2015/052793
§ 371 (c)(1),
(2) Date: Jul. 29, 2016

(87) PCT Pub. No.: WO2015/115634
PCT Pub. Date: Aug. 6, 2015

(65) Prior Publication Data
US 2017/0174908 A1    Jun. 22, 2017

(30) Foreign Application Priority Data

Feb. 3, 2014  (JP) .................................. 2014-018529

(51) Int. Cl.
| | | |
|---|---|---|
| C09D 7/65 | (2018.01) | |
| C09D 7/12 | (2006.01) | |
| C09D 5/02 | (2006.01) | |
| C09D 125/14 | (2006.01) | |
| C09D 133/08 | (2006.01) | |

(52) U.S. Cl.
CPC ............... C09D 7/65 (2018.01); C09D 5/022 (2013.01); C09D 7/125 (2013.01); C09D 125/14 (2013.01); C09D 133/08 (2013.01)

(58) Field of Classification Search
CPC .......... C09D 7/65; C09D 7/125; C09D 5/022; C09D 125/14; C09D 133/08
See application file for complete search history.

(56) References Cited

U.S. PATENT DOCUMENTS 5,977,398 A * 11/1999 Komiya ............... C08G 18/283
                                                              560/25
2011/0313053 A1    12/2011 Münzenberg et al.

FOREIGN PATENT DOCUMENTS

| JP | 9-71767 | 3/1997 | |
|---|---|---|---|
| JP | 10-245541 | 9/1998 | |
| JP | 11-508631 | 7/1999 | |
| JP | 2000-239120 | 9/2000 | |
| JP | 2002-69430 | 3/2002 | |
| JP | 2002-226542 | * 8/2002 | ............ C08G 18/47 |
| JP | 2013-122011 | 6/2013 | |
| JP | 2013-227367 | 11/2013 | |

OTHER PUBLICATIONS

Extended European Search Report dated Sep. 20, 2017 in European Application No. 15742630.5.
International Search Report dated Apr. 14, 2015 in International (PCT) Application No. PCT/JP2015/052793.

* cited by examiner

*Primary Examiner* — John E Uselding
(74) *Attorney, Agent, or Firm* — Wenderoth, Lind & Ponack, L.L.P.

(57) ABSTRACT

The present invention provides a viscosity modifier composition including a compound (A) represented by the general formula (1) and a compound (B) represented by the general formula (2) at a mass ratio (A)/(B) of from 70/30 to 95/5, an emulsion composition and a water-based paint composition including the viscosity modifier composition.

20 Claims, No Drawings

VISCOSITY MODIFIER COMPOSITION

TECHNICAL FIELD

This invention relates to a viscosity modifier composition that excels in miscibility with specific water-based emulsions or water-based paints and also in product stability after mixing and which exhibits good viscosity modification effects.

BACKGROUND ART

Viscosity or viscous properties corresponding to a usage method or usage objective are generally imparted to water-based emulsions, or water-based paints and pressure-sensitive adhesives using such emulsions, and these are normally imparted by viscosity modifiers. Natural viscosity modifiers such as carboxymethyl cellulose and hydroxyethyl cellulose, alkali-thickening viscosity modifiers which increase viscosity with an alkali, such as polyacrylic acid or copolymers including polyacrylic acid, and urethane-type viscosity modifiers such as urethane-modified polyethers are known, for example, and in recent years, demand has grown for urethane-type viscosity modifiers that have good water resistance and are not affected by pH.

The advantage of urethane-type viscosity modifiers is that they come in various structures and can be selected according to the application (see, for example, Patent Documents 1 and 2). Meanwhile, some urethane-type viscosity modifiers have a high viscosity and are difficult to handle, and some have poor miscibility with water-based emulsions. As a result, a long time is often required to uniformly mix them with emulsions. Another problem is that the product stability (referred to hereinbelow as "product stability") of emulsions to which a viscosity modifier has been added is poor; that is, the viscosities of some emulsions change significantly after a viscosity modifier has been mixed therewith. Accordingly, methods using specific solvents for resolving such problems are known (see, for example, Patent Documents 3 and 4). Such methods make it possible to reduce the viscosity of the urethane-type viscosity modifiers and improve compatibility thereof with emulsions.

CITATION LIST

Patent Document

Patent Document 1: Japanese Patent Laid-open No. H9-071767

Patent Document 2: Japanese Patent Laid-open No. H10-245541

Patent Document 3: Japanese Patent Laid-open No. H11-508631

Patent Document 4: Japanese Patent Laid-open No. 2013-227367

SUMMARY OF INVENTION

Technical Problem

However, even when the specific solvents mentioned above are used, it is difficult to improve the product stability. In particular, when a resin constituting a water-based emulsion, etc. is highly hydrophobic, the product stability may become a significant problem under severe conditions realized under high temperatures. More specifically, in the case of emulsion resins including an aromatic group such as a benzene ring or a naphthalene ring, the product stability is degraded and the product viscosity decreases or increases. This is apparently because the resin is strongly hydrophobic and, therefore, a urethane-type viscosity modifier having a high solubility in water cannot be stable in the system and may, for example, separate even after dissolution. This phenomenon cannot be prevented even by adding the above-mentioned solvents. The use of a solvent is also undesirable because people handling the solvent may feel uncomfortable due to the volatile components, or the environment and people may be adversely affected.

Accordingly, a problem to be resolved by the invention is to provide a urethane-type viscosity modifier composition giving good product stability to emulsions using highly hydrophobic monomers (for example, aromatic olefins such as styrene and methyl styrene).

Solution to Problem

As a result of keen study, the inventors of the present invention found a urethane-type viscosity modifier composition giving good product stability to emulsions formed by using highly hydrophobic monomers to complete the present invention. Thus, the present invention provides a viscosity modifier composition comprising a compound (A) represented by the following general formula (1) and a compound (B) represented by the following general formula (2) at a mass ratio (A)/(B) of from 70/30 to 95/5:

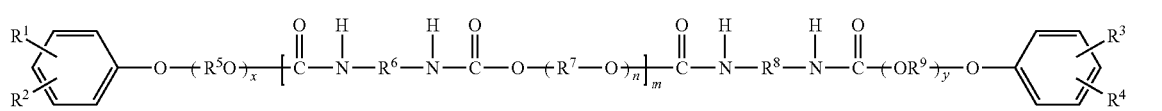

(1)

where $R^1$ to $R^4$ each represent a hydrogen atom, an alkyl group having 1 to 12 carbon atoms, or an aromatic hydrocarbon group having 6 to 15 carbon atoms, $R^5$ and $R^9$ each represent an ethylene group or a propylene group, $R^6$ and $R^8$ each represent a divalent saturated hydrocarbon group having 3 to 13 carbon atoms, $R^7$ represents an ethylene group, x and y represent a number from 0 to 50, n represents a number from 50 to 500, and m represents a number from 1 to 10,

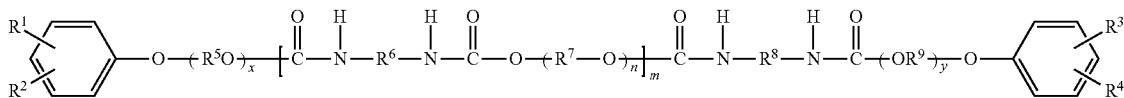

where $R^{10}$ to $R^{13}$ each represent a hydrogen atom, an alkyl group having 1 to 12 carbon atoms, or an aromatic hydrocarbon group having 6 to 15 carbon atoms, $R^{14}$ and $R^{16}$ each represent an ethylene group or a propylene group, $R^{15}$ represents a divalent saturated hydrocarbon group having 3 to 13 carbon atoms, and p and q represent a number from 3 to 50.

Advantageous Effects of Invention

The effect of the invention lies in the provision of a urethane-type viscosity modifier composition giving good product stability to emulsions using highly hydrophobic monomers.

DESCRIPTION OF EMBODIMENTS

The compound (A) used in accordance with the present invention is represented by the following general formula (1).

a dipropyl phenyl group, a dibutyl phenyl group, a ditertiary butyl phenyl group, and a trimethyl phenyl group; and an aromatic alkyl group such as a phenyl methyl group (benzyl group), a phenyl ethyl group, a 1-phenyl ethyl group, a 1-methyl-1-phenyl ethyl group, a phenyl propyl group, a phenyl butyl group, a phenyl tertiary butyl group, a phenyl pentyl group, a phenyl isopentyl group, a phenyl hexyl group, a phenyl isohexyl group, a phenyl heptyl group, a phenyl isoheptyl group, a phenyl octyl group, a phenyl isooctyl group, a phenyl nonyl group, and a phenyl isononyl group. Among these, a 1-phenyl ethyl group and a 1-methyl-1-phenyl ethyl group are preferred.

Among these, it is preferred that at least one of $R^1$ and $R^3$ be an alkyl group having 6 to 15 carbon atoms or an aromatic hydrocarbon group having 6 to 15 carbon atoms, it is more preferred that at least one of $R^1$ and $R^3$ be an aromatic hydrocarbon group having 6 to 15 carbon atoms, it is even more preferred that both of $R^1$ and $R^3$ be an aromatic alkyl group having 7 to 15 carbon atoms, it is still more preferred

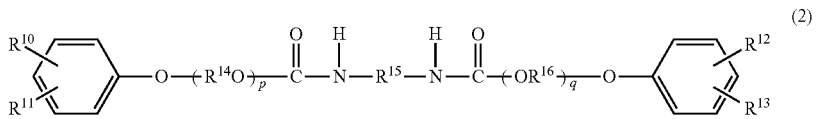

where $R^1$ to $R^4$ each represent a hydrogen atom, an alkyl group having 1 to 12 carbon atoms, or an aromatic hydrocarbon group having 6 to 15 carbon atoms, $R^5$ and $R^9$ each represent an ethylene group or a propylene group, $R^6$ and $R^8$ each represent a divalent saturated hydrocarbon group having 3 to 13 carbon atoms, $R^7$ represents an ethylene group, x and y represent a number from 0 to 50, n represents a number from 50 to 500, and m represents a number from 1 to 10.

$R^1$ to $R^4$ in the general formula (1) each represent a hydrogen atom, an alkyl group having 1 to 12 carbon atoms, or an aromatic hydrocarbon group having 6 to 15 carbon atoms. Examples of the alkyl group having 1 to 12 carbon atoms include a methyl group, an ethyl group, a propyl group, a butyl group, a tertiary butyl group, a pentyl group, an isopentyl group, a hexyl group, an isohexyl group, a heptyl group, an isoheptyl group, an octyl group, an isooctyl group, a nonyl group, an isononyl group, a decyl group, an isodecyl group, an undecyl group, an isoundecyl group, a dodecyl group, and an isododecyl group. A nonyl group is preferred among these.

Examples of the aromatic hydrocarbon group having 6 to 15 carbon atoms include an aryl group such as a phenyl group, a methyl phenyl group, an ethyl phenyl group, a propyl phenyl group, a butyl phenyl group, a tertiary butyl phenyl group, a pentyl phenyl group, an isopentyl phenyl group, a hexyl phenyl group, an isohexyl phenyl group, a heptyl phenyl group, an isoheptyl phenyl group, an octyl phenyl group, an isooctyl phenyl group, a nonyl phenyl group, an isononyl phenyl group, a dimethyl phenyl group, that both of $R^1$ and $R^3$ be an aromatic alkyl group having 7 to 10 carbon atoms, and it is most preferred that both of $R^1$ and $R^3$ be aromatic alkyl groups having 8 or 9 carbon atoms.

$R^5$ and $R^9$ in the general formula (1) each represent an ethylene group or a propylene group. The oxyalkylene group represented by —$R^5O$— is a polymer with x repeating units, but the ratio of oxyethylene groups and oxypropylene groups in the x oxyalkylene groups is not particularly defined. However, since the miscibility of the emulsion is good, the ratio of oxyethylene groups in the x oxyalkylene groups is preferably 50 mol % or more, more preferably 70 mol % or more, and even more preferably 90 mol % or more.

The oxyalkylene group with $R^9$ which is represented by —$R^9O$— is also defined as described hereinabove, and the ratio of oxyethylene groups in the y oxyalkylene groups is preferably 50 mol % or more, more preferably 70 mol % or more, even more preferably 90 mol % or more, and it is more preferable that all oxyalkylene groups be oxyethylene groups.

Here, x and y each represent a number from 0 to 50, preferably from 3 to 30, more preferably from 5 to 25, and even more preferably from 10 to 20. Where those values exceed 50, hydrophilicity becomes too high and miscibility and product stability may not be improved.

$R^6$ and $R^8$ in the general formula (1) each represent a divalent saturated hydrocarbon having 3 to 13 carbon atoms, preferably an alkylene group. Examples of an alkylene group having 3 to 13 carbon atoms include a propylene group, a butylene group, a pentylene group, a hexylene group, a heptylene group, an octylene group, a nonylene group, a decylene group, an undecylene group, and a dodecylene group. A hexylene group is preferred among these.

It is preferred that $R^6$ and $R^8$ in the general formula (1) each be an alkylene group having 3 to 13 carbon atoms, more preferably an alkylene group having 3 to 10 carbon atoms, even more preferably an alkylene group having 4 to 8 carbon atoms, still more preferably an alkylene group having 5 to 7 carbon atoms, and most preferably an alkylene group having 6 carbon atoms.

$R^6$ and $R^8$ are groups derived from diisocyanates being starting materials represented by OCN—$R^6$—NCO and OCN—$R^8$—NCO, respectively. Examples of such isocyanate compound include trimethylene diisocyanate, tetraethylene diisocyanate, pentamethylene diisocyanate, hexamethylene diisocyanate, 2,2-dimethylpentane diisocyanate, octamethylene diisocyanate, 2,2,4-trimethylpentane diisocyanate, nonamethylene diisocyanate, decamethylene diisocyanate, 3-butoxyhexane diisocyanate, dodecamethylene diisocyanate, and 4,4'-bis-cyclohexylmethane diisocyanate. Among these, hexamethylene diisocyanate and 4,4'-bis-cyclohexylmethane diisocyanate are preferable and hexamethylene diisocyanate is more preferable because they are readily available.

Among diisocyanates, there are also aromatic diisocyanates typified by tolylene diisocyanate, but where an aromatic ring is included in $R^6$ or $R^8$, it produces no positive effect on solubility and stability. Thus, since $R^6$ and $R^8$ in the general formula (1) are each at a hydrophilic group position and the hydrophobicity is high because an aromatic group is in the both-end hydrophobic groups in General Formula (1), where a highly hydrophobic aromatic ring is introduced in the hydrophilic group position, the solubility of the compound (A) in water is decreased, which can adversely affect the product stability.

$R^7$ in the general formula (1) represents an ethylene group, and n represents a number from 50 to 500. The oxyethylene group represented by —$R^7$O— is a polymer with n repeating units, and the polyoxyethylene moiety becomes part of the hydrophilic group in the general formula (1). In view of the balance of the hydrophilic groups and hydrophobic groups, the value of n is preferably from 80 to 450, more preferably from 100 to 400, even more preferably from 120 to 300, and most preferably from 130 to 260. Where the value of n is less than 50, the group may not function as a hydrophilic group, and where this value exceeds 500, the function thereof as a hydrophilic group becomes excessive and the viscosity modification function may not be effectively exhibited.

In the general formula (1), m is a number from 1 to 10. Depending on the compounding ratio of starting materials, reaction method, and reaction conditions in the manufacture of the compound (A), a composition can be obtained in which compounds represented by the general formula (1) with different values of m are mixed together. Where the compound (A) is a compound with the value of m from 1 to 10, it may be an individual compound or a mixture, but it is preferred that the total amount of the compounds with m from 1 to 3 be 50% by mass or more of the entire compounds. Where the total amount of the compounds with m from 1 to 3 is less than 50% by mass of the entire compounds, the dissolution of the compound (A) added to an emulsion, or the like, takes a long time and cost-efficiency can be lost.

The compound (B) used of the present invention is represented by the following general formula (2).

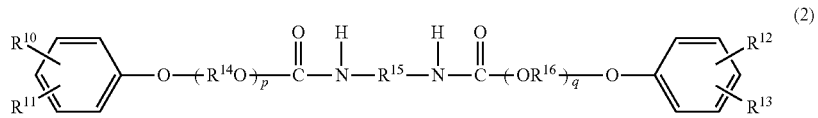

where $R^{10}$ to $R^{13}$ each represent a hydrogen atom, an alkyl group having 1 to 12 carbon atoms, or an aromatic hydrocarbon group having 6 to 15 carbon atoms, $R^{14}$ and $R^{16}$ each represent an ethylene group or a propylene group, $R^{15}$ represents a divalent saturated hydrocarbon group having 3 to 13 carbon atoms, and p and q represent a number from 3 to 50.

$R^{10}$ to $R^{13}$ in the general formula (2) each represent a hydrogen atom, an alkyl group having 1 to 12 carbon atoms, or an aromatic hydrocarbon group having 6 to 15 carbon atoms. Examples of the alkyl group having 1 to 12 carbon atoms include a methyl group, an ethyl group, a propyl group, a butyl group, a tertiary butyl group, a pentyl group, an isopentyl group, a hexyl group, an isohexyl group, a heptyl group, an isoheptyl group, an octyl group, an isooctyl group, a nonyl group, an isononyl group, a decyl group, an isodecyl group, an undecyl group, an isoundecyl group, a dodecyl group, and an isododecyl group.

Examples of the aromatic hydrocarbon group having 6 to 15 carbon atoms include an aryl group such as a phenyl group, a methyl phenyl group, an ethyl phenyl group, a propyl phenyl group, a butyl phenyl group, a tertiary butyl phenyl group, a pentyl phenyl group, an isopentyl phenyl group, a hexyl phenyl group, an isohexyl phenyl group, a heptyl phenyl group, an isoheptyl phenyl group, an octyl phenyl group, an isooctyl phenyl group, a nonyl phenyl group, an isononyl phenyl group, a dimethyl phenyl group, a dipropyl phenyl group, a dibutyl phenyl group, a ditertiary butyl phenyl group, and a trimethyl phenyl group; and an aromatic alkyl group such as a phenyl methyl group (benzyl group), a phenyl ethyl group, a 1-phenyl ethyl group, a phenyl propyl group, a 1-methyl-1-phenyl ethyl group, a phenyl butyl group, a phenyl tertiary butyl group, a phenyl pentyl group, a phenyl isopentyl group, a phenyl hexyl group, a phenyl isohexyl group, a phenyl heptyl group, a phenyl isoheptyl group, a phenyl octyl group, a phenyl isooctyl group, a phenyl nonyl group, and a phenyl isononyl group. Among these, a 1-phenyl ethyl group and a 1-methyl-1-phenyl ethyl group are preferred.

Among these, it is preferred that at least one of $R^{10}$ and $R^{12}$ be an alkyl group having 6 to 15 carbon atoms or an aromatic hydrocarbon group having 6 to 15 carbon atoms, it is more preferred that at least one of $R^{10}$ and $R^{12}$ be an aromatic hydrocarbon group having 6 to 15 carbon atoms, it is even more preferred that both of $R^{10}$ and $R^{12}$ be an aromatic alkyl group having 7 to 15 carbon atoms, it is still more preferred that both of $R^{10}$ and $R^{12}$ be an aromatic alkyl group having 7 to 10 carbon atoms, and it is most preferable that both of $R^{10}$ and $R^{12}$ be aromatic alkyl groups having 8 or 9 carbon atoms.

$R^{14}$ and $R^{16}$ in the general formula (2) each represent an ethylene group or a propylene group. The oxyalkylene group represented by —$R^{14}O$— is a polymer with p repeating units, but the ratio of oxyethylene groups and oxypropylene groups in the p oxyalkylene groups is not particularly defined. However, since the miscibility of the emulsion is good, the ratio of oxyethylene groups in the p oxyalkylene groups is preferably 70 mol % or more, more preferably 90 mol % or more, and most preferably 100 mol %.

The oxyalkylene group represented by —$R^{16}O$— is also defined as described hereinabove, and the ratio of oxyethylene groups in the q oxyalkylene groups is preferably 70 mol % or more, more preferably 90 mol % or more, and most preferably 100 mol %.

Here, p and q each represent a number from 3 to 50, preferably from 5 to 30, more preferably from 7 to 25, and even more preferably from 10 to 20. Where those values are less than 3, hydrophilicity is insufficient and the compound may not be entirely dissolved when added to the emulsion. Where those values exceed 50, the effect of improving the product stability may not be exhibited.

$R^{15}$ in General Formula (2) represents a divalent saturated hydrocarbon having 3 to 13 carbon atoms, preferably an alkylene group. Examples of an alkylene group having 3 to 13 carbon atoms include a propylene group, a butylene group, a pentylene group, a hexylene group, a heptylene group, an octylene group, a nonylene group, a decylene group, an undecylene group, and a dodecylene group. A hexylene group is preferred among these.

It is preferred that $R^{15}$ in the general formula (2) be an alkylene group having 3 to 13 carbon atoms, more preferably an alkylene group having 3 to 10 carbon atoms, even more preferably an alkylene group having 4 to 8 carbon atoms, still more preferably an alkylene group having 5 to 7 carbon atoms, and most preferably an alkylene group having 6 carbon atoms.

$R^{15}$ is a group derived from a diisocyanate being a starting material represented by OCN—$R^{15}$—NCO. Examples of such diisocyanate include trimethylene diisocyanate, tetramethylene diisocyanate, pentamethylene diisocyanate, hexamethylene diisocyanate, 2,2-dimethylpentane diisocyanate, octamethylene diisocyanate, 2,2,4-trimethylpentane diisocyanate, nonamethylene diisocyanate, decamethylene diisocyanate, 3-butoxyhexane diisocyanate, dodecamethylene diisocyanate, and 4,4'-bis-cyclohexylmethane diisocyanate. Among these, hexamethylene diisocyanate and 4,4'-bis-cyclohexylmethane diisocyanate are preferred starting materials because they are readily available, and hexamethylene diisocyanate is more preferable.

Among diisocyanates, there are also aromatic diisocyanates typified by tolylene diisocyanate, but where an aromatic ring is included in $R^{15}$, hydrophobicity easily increases which can result in incomplete dissolution when the compound is added to an emulsion, or a thickening effect may not be obtained.

A method for manufacturing the compound (A) is not limited, and any method may be used. However, it is preferred that the compound be manufactured from the starting materials represented by the following general formulas (3) to (7).

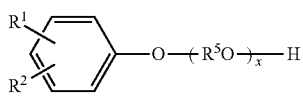
(3)

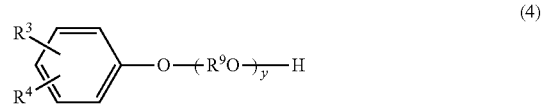

where $R^1$ and $R^2$ each represent a hydrogen atom, an alkyl group having 1 to 12 carbon atoms, or an aromatic hydrocarbon group having 6 to 15 carbon atoms, $R^5$ represents an ethylene group or a propylene group, and x represents a number from 0 to 50.

where $R^3$ and $R^4$ each represent a hydrogen atom, an alkyl group having 1 to 12 carbon atoms, or an aromatic hydrocarbon group having 6 to 15 carbon atoms, $R^9$ represents an ethylene group or a propylene group, and y represents a number from 0 to 50.

HO—(—$R^7O$—)—H  (5)

where $R^7$ represents an ethylene group, and n represents a number from 50 to 500.

OCN—$R^6$—NCO  (6)

where $R^6$ represents a divalent saturated hydrocarbon group having 3 to 13 carbon atoms.

OCN—$R^8$—NCO  (7)

where $R^8$ represents a divalent saturated hydrocarbon group having 3 to 13 carbon atoms.

The starting material alcohols represented by the general formulas (3) and (4) may be the same or different, but since fewer kinds of starting materials provides easier handling, it is preferred that the starting material alcohols represented by the general formulas (3) and (4) be the same. In the manufacturing method, for example, 0.8 mol to 1.2 mol, preferably 0.9 mol to 1.1 mol of the starting material polyethylene glycol represented by the general formula (5) and a total of 1.8 mol to 2.2 mol, preferably 1.9 mol to 2.1 mol of the starting material diisocyanates represented by the general formulas (6) and (7) may be reacted with 2 mol of the starting material alcohol, and typically 1 mol of the starting material polyethylene glycol and 2 mol of the starting material isocyanates may be reacted with 2 mol of the starting material alcohol. As for the specific reaction conditions, it is possible to add the starting material diisocyanates to a mixture of the starting material alcohol and starting material polyethylene glycol and conduct the reaction for 1 h to 10 h at 60° C. to 100° C., or to add the starting material diisocyanates to the starting material polyalkylene glycol, conduct the reaction for 1 h to 5 h at 60° C. to 100° C., and then add the starting material alcohol and further conduct the reaction at 1 h to 5 h at the same temperature. Although the reaction proceeds without a catalyst, a catalyst may also be used. Examples of suitable catalysts include metal halides such as titanium tetrachloride, hafnium chloride, zirconium chloride, aluminum chloride, gallium chloride, indium chloride, iron chloride, tin chloride, and boron fluoride; hydroxides, alcoholates, and carbonates of alkali metals or alkaline earth metals such as sodium hydroxide, potassium hydroxide, sodium methylate, and sodium carbonate; metal oxides such as aluminum oxide, calcium oxide, barium oxide, and sodium oxide; organometallic compounds such as tetraisopropyl titanate, dibutyltin dichloride, dibutyltin oxide, and dibutyltin bis(2-ethylhexyl thioglycolate); and soaps such as sodium octylate, potassium octylate, sodium laurate, and potassium laurate, and those catalysts may be used at about 0.01% by mass to 1% by mass, based on the whole system.

The compound represented by the general formula (1) can be obtained by the abovementioned reaction, but under some reaction conditions, a compound can be obtained in which the value of m in the general formula (1) is 0. The compound with the value of m equal to 0 is the compound represented by the general formula (2), but the yield of this compound is about 0% by mass to 3% by mass.

The method for manufacturing the compound (B) is not limited, and any method may be used. However, it is preferred that the compound be manufactured from the starting materials represented by the following general formulas (8) to (10).

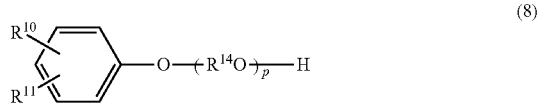
(8)

where $R^{10}$ and $R^{11}$ each represent a hydrogen atom, an alkyl group having 1 to 12 carbon atoms, or an aromatic hydrocarbon group having 6 to 15 carbon atoms, $R^{14}$ represents an ethylene group or a propylene group, and p represents a number from 3 to 50.

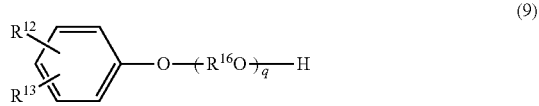
(9)

where $R^{12}$ and $R^{13}$ each represent a hydrogen atom, an alkyl group having 1 to 12 carbon atoms, or an aromatic hydrocarbon group having 6 to 15 carbon atoms, $R^{16}$ represents an ethylene group or a propylene group, and q represents a number from 3 to 50.

$$OCN-R^{15}-NCO \quad (10)$$

where $R^{15}$ represents a divalent saturated hydrocarbon group having 3 to 13 carbon atoms.

The starting material alcohols represented by the general formulas (8) and (9) may be the same or different, but since fewer kinds of starting materials provides easier handling, it is preferred that the starting material alcohols represented by the general formulas (8) and (9) be the same. In the manufacturing method, for example, 0.9 mol to 1.1 mol, preferably 0.95 mol to 1.05 mol of the starting material diisocyanate represented by the general formula (10) may be reacted with 2 mol of the starting material alcohol, and more preferably 1 mol of the starting material diisocyanate is reacted with 2 mol of the starting material alcohol.

The viscosity modifier composition of the present invention is a mixture of the compound (A) and the compound (B), but when the compound (A) is manufactured, the compound (B) is sometimes obtained as a byproduct. However, the amount of the byproduct is about 3% by mass at most. Therefore, in order to obtain the viscosity modifier composition of the present invention, it is necessary to manufacture the compound (B) separately and mix it with the manufactured compound (A). The compound (A) and the compound (B) are included at a weight ratio of (A)/(B)=70/30 to 95/5, preferably at (A)/(B)=80/20 to 93/7, more preferably at (A)/(B)=85/15 to 90/10. Where the compound (B) is produced when the compound (A) is manufactured, the amount of the compound (B) which is to be mixed to obtain the abovementioned ratio needs to be determined with consideration for the produced amount. Since the compound (B) is higher in hydrophobicity than the compound (A), where the compounding ratio of the compound (B) is too high, product stability after addition to the emulsion can degrade, and where the compounding ratio of the compound (B) is too low, product stability may not be improved. The mixing ratio of the components can be analyzed by gel permeation chromatography.

The compound (A) and the compound (B) constituting the viscosity modifier composition of the present invention are each a solid or viscous substance at room temperature. The viscosity modifier composition of the present invention is added to an aqueous solution such as emulsion and used upon dissolution therein, but since the dissolution thereof in the form of a solid or viscous substance takes time, the viscosity modifier composition is preferably prepared in a liquid form by dissolving in a solvent such as water. Although not being specifically defined, the amount of the solvent is preferably such that the viscosity modifier composition of the present invention takes 10% by mass to 50% by mass, more preferably 15% by mass to 40% by mass.

Examples of suitable solvents include aqueous solvents such as water, methanol, ethanol, and propanol, but since the use of volatile solvents can be restricted at some sites, water is the most preferred among these. In order to enhance the solubility of the viscosity modifier composition of the present invention, a low-volatility alcohol may be added together with water. Examples of such suitable alcohols include ethylene glycol, propylene glycol, butylene glycol, glycerin, diethylene glycol, dipropylene glycol, ethylene glycol monomethyl ether, ethylene glycol monoethyl ether, ethylene glycol monopropyl ether, ethylene glycol monobutyl ether, ethylene glycol monopentyl ether, ethylene glycol monohexyl ether, ethylene glycol monooctyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, and diethylene glycol monooctyl ether. When adding these alcohols, it is preferred to add 2 parts by mass to 50 parts by mass, more preferably 5 parts by mass to 30 parts by mass with respect to 100 parts by mass of water.

The emulsion composition of the present invention includes 0.1 parts by mass to 5 parts by mass, preferably 0.2 parts by mass to 3 parts by mass of the viscosity modifier composition of the present invention with respect to 100 parts by mass of the emulsion. Where the amount of the viscosity modifier composition is less than 0.1 parts by mass the effect as the viscosity modifier may not be obtained, and where the amount is above 5 parts by mass, an effect commensurate with the amount added may not be obtained or the composition sometimes cannot be completely dissolved in the emulsion.

Any well-known emulsion can be used. Examples of such emulsions include urethane-based emulsions, acrylate-based emulsions, styrene-based emulsions, vinyl acetate-based emulsions, SBR (styrene/butadiene) emulsions, ABS (acrylonitrile/butadiene/styrene) emulsions, BR (butadiene) emulsions, IR (isoprene) emulsions, NBR (acrylonitrile/butadiene) emulsions or mixtures thereof.

Examples of the urethane-based emulsions include emulsions based on polyether polyols, polyester polyols, and polycarbonate polyols.

Examples of acrylate-based emulsions include emulsions comprising emulsion polymers formed by monomers such as (meth)acrylic acid alone (or esters thereof), (meth)acrylic acid (or esters thereof)/vinyl acetate, (meth)acrylic acid (or esters thereof)/acrylonitrile, (meth)acrylic acid (or esters thereof)/butadiene, (meth)acrylic acid (or esters thereof)/vinylidene chloride, (meth)acrylic acid (or esters thereof)/allylamine, (meth)acrylic acid (or esters thereof)/vinyl pyridine, (meth)acrylic acid (or esters thereof)/N,N-diethylaminoethyl vinyl ether, and emulsions comprising cyclohexyl methacrylate-based emulsion polymers, epoxy-modified emulsion polymers, or urethane-modified emulsion polymers.

Examples of the styrene-based emulsions include emulsions comprising emulsion polymers formed by monomers such as styrene alone, styrene/acrylonitrile, styrene/butadiene, styrene/fumaric nitrile, styrene/maleic nitrile, styrene/cyanoacrylic acid ester, styrene/phenyl vinyl acetate, styrene/chloromethylstyrene, styrene/dichlorostyrene, styrene/vinylcarbazole, styrene/N,N-diphenyl acrylamide, styrene/methylstyrene, acrylonitrile/butadiene/styrene, styrene/acrylonitrile/methyl styrene, styrene/acrylonitrile/vinyl carbazole, styrene/maleic acid, styrene/(meth)acrylic acid, styrene/(meth)acrylic acid ester, styrene/(meth)acrylic acid/(meth)acrylic acid ester, and styrene/vinyl acetate.

Examples of the vinyl acetate-based emulsion include emulsions comprising emulsion polymers formed by monomers such as vinyl acetate alone, vinyl acetate/vinyl chloride, vinyl acetate/acrylonitrile, vinyl acetate/maleic acid (or esters thereof), vinyl acetate/fumaric acid (or esters thereof), vinyl acetate/ethylene, vinyl acetate/propylene, vinyl acetate/isobutylene, vinyl acetate/vinylidene chloride, vinyl acetate/cyclopentadiene, vinyl acetate/crotonic acid, vinyl acetate/acrolein, and vinyl acetate/alkyl vinyl ether.

Among these emulsions, the effect of the viscosity modifier composition of the present invention is exhibited the greatest in the styrene-based emulsions. The content of styrene in the entire resin (emulsion polymer) in the styrene-based emulsion is not defined, but the amount of styrene-derived units in the resin is usually 20% by mass or more, preferably 30% by mass or more, more preferably 40% by mass or more, an even more preferably 45% by mass or more. Even in emulsions using no styrene, the viscosity modifier composition of the present invention exhibits an effect similar to that of other urethane-based viscosity modifiers.

The viscosity modifier composition of the present invention can be used for water-based paints, adhesives, and pressure-sensitive adhesives in the form of water-based emulsions.

For example, where the viscosity modifier composition of the present invention is used for a water-based paint, the water-based paint composition includes 0.1 parts by mass to 5 parts by mass, preferably 0.2 parts by mass to 3 parts by mass of the viscosity modifier composition of the present invention with respect to 100 parts by mass of the water-based paint. Where the amount of the viscosity modifier composition is less than 0.1 parts by mass, the effect of the viscosity modifier may not be obtained, and where the amount of the viscosity modifier composition is above 5 parts by mass, an effect corresponding to the amount added may not be obtained or the composition sometimes cannot be completely dissolved in the water-based paint. The emulsion to be used in the water-based paint may be selected, as appropriate, from the abovementioned emulsions.

Where the viscosity modifier composition of the present invention is used for an adhesive, the adhesive composition includes 0.1 parts by mass to 5 parts by mass, preferably 0.2 parts by mass to 3 parts by mass of the viscosity modifier composition of the present invention with respect to 100 parts by mass of the adhesive. Where the amount of the viscosity modifier composition is less than 0.1 parts by mass, the effect of the viscosity modifier may not be obtained, and where the amount of the viscosity modifier composition is above 5 parts by mass, an effect commensurate with the amount added may not be obtained or the composition sometimes cannot be completely dissolved in the adhesive. The emulsion to be used in the adhesive may be selected, as appropriate, from the abovementioned emulsions.

Where the viscosity modifier composition of the present invention is used for a pressure-sensitive adhesive, the pressure-sensitive adhesive composition includes 0.1 parts by mass to 5 parts by mass, preferably 0.2 parts by mass to 3 parts by mass of the viscosity modifier composition of the present invention with respect to 100 parts by mass of the pressure-sensitive adhesive. Where the amount of the viscosity modifier composition is less than 0.1 parts by mass, the effect of the viscosity modifier may not be obtained, and where the amount of the viscosity modifier composition is above 5 parts by mass, an effect commensurate with the amount added may not be obtained or the composition sometimes cannot be completely dissolved in the pressure-sensitive adhesive. The emulsion to be used in the pressure-sensitive adhesive may be selected, as appropriate, from the abovementioned emulsions.

EXAMPLES

The present invention is demonstrated in detail hereinbelow by examples thereof.

Production Example 1

A total of 480 g (0.08 mol) of polyethylene glycol (molecular weight 6000) and 176 g (0.16 mol) of ethylene oxide (EO) 20-mol adduct of nonyl phenol were charged into a four-neck flask having a volume of 1000 ml and equipped with a thermometer, a nitrogen introducing tube, and a stirrer. Dehydration was then performed for 3 h at 90° C. to 100° C. under a reduced pressure (10 mmHg or less), and the amount of moisture in the system was made 0.03%. The system was then cooled to 80° C., 26.9 g (0.16 mol) of hexamethylene diisocyanate (HDI) was added, a reaction was conducted for 2 h at 80° C. to 90° C. under a nitrogen gas flow, the content of isocyanate was confirmed with an infrared spectrometer (IR) to be 0%, and a reaction product A-1 which was a pale yellow solid at ambient temperature was obtained.

Production Examples 2 to 5

Products A-2 to A-5 were synthesized by the same method as in Production Example 1. The starting materials and the charging ratios thereof are presented in Table 1 below. The products A-1 to A-3 are (A) components of the present invention, and the products A-4 and A-5 are comparative components.

TABLE 1

| A-1 | Polyethylene glycol (MW6000) 0.08 mol | Nonyl phenol 20 EO 0.16 mol | Hexamethylene diisocyanate 0.16 mol |
|---|---|---|---|
| A-2 | Polyethylene glycol (MW8000) 0.08 mol | Paracumyl phenol 15 EO 0.16 mol | Hexamethylene diisocyanate 0.16 mol |

TABLE 1-continued

| | | | |
|---|---|---|---|
| A-3 | Polyethylene glycol (MW11,000) 0.08 mol | Styrenated phenol 10 EO 0.16 mol | Hexamethylene diisocyanate 0.16 mol |
| A-4 | Polyethylene glycol (MW6000) 0.08 mol | Stearyl alcohol 20 EO 0.16 mol | Hexamethylene diisocyanate 0.16 mol |
| A-5 | Polyethylene glycol (MW6000) 0.08 mol | Nonyl phenol 20 EO 0.16 mol | Tolylene diisocyanate 0.16 mol |

When polyethylene glycol with a molecular weight of 6000 is used, a compound wherein the value of n is 136 in the general formula (1) is obtained.

When polyethylene glycol with a molecular weight of 8000 is used, a compound wherein the value of n is 181 in the general formula (1) is obtained.

When polyethylene glycol with a molecular weight of 11,000 is used, a compound wherein the value of n is 250 in the general formula (1) is obtained.

Production Example 6

A total of 176 g (0.16 mol) of ethylene oxide (EO) 20-mol adduct of nonyl phenol was charged into a four-neck flask having a volume of 1000 ml and equipped with a thermometer, a nitrogen introducing tube, and a stirrer. Dehydration was then performed for 3 h at 90° C. to 100° C. under a reduced pressure (10 mmHg or less), and the amount of moisture in the system was made 0.03%. The system was then cooled to 80° C., 13.4 g (0.08 mol) of hexamethylene diisocyanate (HDI) was added, a reaction was conducted for 2 h at 80° C. to 90° C. under a nitrogen gas flow, the content of isocyanate was confirmed with an infrared spectrometer (IR) to be 0%, and a reaction product B-1 which was pale yellow solid at ambient temperature was obtained.

Production Examples 7 to 10

Products B-2 to B-5 were synthesized by the same method as in Production Example 6. The starting materials and the charging ratios thereof are presented in Table 2 below. The products B-1 to B-3 are (B) components of the present invention, and the products B-4 and B-5 are comparative components.

TABLE 2

| | | |
|---|---|---|
| B-1 | Hexamethylene diisocyanate 0.08 mol | Nonyl phenol 20 EO 0.16 mol |
| B-2 | Hexamethylene diisocyanate 0.08 mol | Paracumyl phenol 15 EO 0.16 mol |
| B-3 | Hexamethylene diisocyanate 0.08 mol | Styrenated phenol 10 EO 0.16 mol |
| B-4 | Hexamethylene diisocyanate 0.08 mol | Stearyl alcohol 20 EO 0.16 mol |
| B-5 | Tolylene diisocyanate 0.08 mol | Nonyl phenol 20 EO 0.16 mol |

<Analysis of Content of Each Component>

Since the obtained A-1 to A-5 were mixtures of components with different values of m in the general formula (1), the molecular weight distribution of each component was analyzed under the below-described conditions of GPC analysis. The ratios of components were calculated from the area ratio of charts obtained by the GPC analysis. The analysis results are shown in Table 3. A-4 and A-5 are not represented by the general formula (1), but the amounts of corresponding components are also shown.

Columns used: TSKgel G4000HxI, G3000HxI, G2000HxI (all produced by TOSOH CORPORATION) were connected in series.
Eluent: THF (tetrahydrofuran)
Flow rate: 1 ml/min
Detector: HLC-8120GPC (RI)
Sample concentration: 0.1% by mass (THF solution)
Sample amount: 200 µl
Column temperature: 40° C.

TABLE 3

| | Amounts of components with different m in the general formula (1) (% by mass) | | | |
|---|---|---|---|---|
| | m = 0 | m = 1 | m = 2 | m ≥ 3 |
| A-1 | 2.8 | 31.5 | 28.4 | 37.3 |
| A-2 | 2.7 | 32.3 | 29.1 | 35.9 |
| A-3 | 2.9 | 31.9 | 29.3 | 35.9 |
| A-4 | 2.8 | 31.1 | 29.1 | 37.0 |
| A-5 | 2.7 | 32.3 | 31.2 | 33.8 |

<Preparing Products of the Present Invention>

Products of the present invention and comparative products were produced by blending samples B-1 to B-5 with synthesized A-1 to A-5 by using the abovementioned analytical values. The mixing ratios and compositions of components after mixing are shown in Table 4. In order to mix the component (A) and component (B) homogeneously, the products of the present invention and comparative products were each diluted to 30% by mass with a mixed solution including 80 parts by mass of water and 20 parts by mass of ethylene oxide 6 mol adduct of 2-ethyl hexanol.

TABLE 4

| | | Blending ratio of samples (mass ratio) | Amount of component after blending (% by mass) | |
|---|---|---|---|---|
| | | | m = 0 | m ≥ 0 |
| Examples | 1 | A-1/B-1 = 100/10 | 11.6 | 88.4 |
| | 2 | A-2/B-2 = 100/10 | 11.5 | 88.5 |
| | 3 | A-3/B-3 = 100/10 | 11.7 | 88.3 |
| | 4 | A-3/B-3 = 100/5 | 7.5 | 92.5 |
| | 5 | A-3/B-3 = 100/25 | 22.3 | 77.7 |
| | 6 | A-1/B-3 = 100/10 | 11.6 | 88.4 |
| Comparative Examples | 1 | A-1 = 100 | 2.8 | 97.2 |
| | 2 | A-2 = 100 | 2.7 | 97.3 |
| | 3 | A-3 = 100 | 2.9 | 97.1 |
| | 4 | A-4/B-4 = 100/10 | 11.6 | 88.4 |
| | 5 | A-5/B-5 = 100/10 | 11.5 | 88.5 |
| | 6 | A-3/B-3 = 100/40 | 30.6 | 69.4 |

<Stability Test>

Samples of Examples 1 to 5 and Comparative Examples 1 to 5 were respectively added by 1.5 parts by mass (the amount of component (A) and component (B) only; the solvent not being considered as an added amount) to 100 parts by mass of the emulsion, and the samples were homogeneously dissolved to obtain sample solutions. The viscosity of the as-produced sample solutions was measured. The sample solutions were then placed in sealed containers and allowed to sit for 5 weeks in a thermostat at 40° C. The viscosity of the sample solutions was measured after each week. In the samples with poor product stability the viscosity changed significantly. The change in viscosity is represented by the change rate derived from the following formula.

Change rate (%)={[(viscosity after 5 weeks)−(viscosity of as-produced sample)]/(viscosity of as-produced sample)}×100

The following three emulsions (Emulsions 1 to 3) were used for the test, and the viscosity was measured with a B8H viscometer (rotor number 2) at revolution speeds of 5 rpm, 10 rpm, and 50 rpm. Each viscosity was adjusted to a solid content of 40% by mass. The results relating to emulsions to which no sample was added were taken as blanks.

Emulsion 1: styrene/butyl acrylate/methacrylic acid=48/48/4 (mass ratio)
Emulsion 2: styrene/butyl methacrylate=63/37 (mass ratio)
Emulsion 3: butyl methacrylate/butyl acrylate=55/45 (mass ratio)

When the compound of Comparative Example 6 was added to the emulsion, the compound was not entirely dissolved and remained in the solution. For this reason, the stability test was not performed.

TABLE 5

(test results 1)

Emulsion 1 (mPa · s)

|  |  | As-produced | After 1 week | After 2 weeks | After 3 weeks | After 4 weeks | After 5 weeks | Change rate (%) |
|---|---|---|---|---|---|---|---|---|
| Examples | 1 | 32000 | 29000 | 30000 | 31000 | 31000 | 33000 | 3.1 |
|  | 2 | 30000 | 28500 | 29000 | 30000 | 31000 | 31000 | 3.3 |
|  | 3 | 42000 | 41000 | 42000 | 43000 | 42000 | 42000 | 0 |
|  | 4 | 44000 | 42000 | 42000 | 43500 | 44500 | 45500 | 3.4 |
|  | 5 | 24000 | 21000 | 22000 | 22500 | 23500 | 25000 | 4.2 |
|  | 6 | 33000 | 30000 | 30000 | 32000 | 33000 | 34000 | 3.0 |
| Comparative Examples | 1 | 30000 | 28000 | 27500 | 26000 | 25000 | 24500 | −18.3 |
|  | 2 | 24000 | 21500 | 20500 | 20000 | 19000 | 18500 | −22.9 |
|  | 3 | 38000 | 36000 | 35000 | 33500 | 32500 | 31000 | −18.4 |
|  | 4 | 7600 | 7500 | 7350 | 7200 | 7050 | 6800 | −10.5 |
|  | 5 | 14000 | 12000 | 10500 | 9500 | 8000 | 7000 | −50.0 |
| Blank |  | 420 | 420 | 415 | 415 | 410 | 410 | −2.4 |

TABLE 6

(test results 2)

Emulsion 2 (mPa · s)

|  |  | As-produced | After 1 week | After 2 weeks | After 3 weeks | After 4 weeks | After 5 weeks | Change rate (%) |
|---|---|---|---|---|---|---|---|---|
| Examples | 1 | 22000 | 22000 | 21000 | 22000 | 22000 | 23000 | 4.5 |
|  | 2 | 18000 | 17000 | 17000 | 18000 | 18000 | 19000 | 5.6 |
|  | 3 | 26000 | 25000 | 26000 | 27000 | 26000 | 26000 | 0 |
|  | 4 | 27000 | 26000 | 27000 | 27000 | 28000 | 28000 | 3.7 |
|  | 5 | 23000 | 21000 | 22000 | 23000 | 23000 | 24000 | 4.3 |
|  | 6 | 24000 | 22000 | 23000 | 23000 | 24000 | 25000 | 4.2 |
| Comparavive Examples | 1 | 19000 | 17000 | 16000 | 14500 | 13000 | 12000 | −36.8 |
|  | 2 | 23000 | 22000 | 20500 | 19000 | 18000 | 16500 | −28.3 |
|  | 3 | 27000 | 25500 | 24000 | 23000 | 22000 | 21000 | −22.2 |
|  | 4 | 4000 | 3500 | 3200 | 3000 | 2800 | 2600 | −35.0 |
|  | 5 | 10000 | 9000 | 8500 | 7800 | 7300 | 6800 | −32.0 |
| Blank |  | 390 | 385 | 380 | 370 | 365 | 360 | 7.7 |

TABLE 7

(test results 3)

Emulsion 3 (mPa · s)

|  |  | As-produced | After 1 week | After 2 weeks | After 3 weeks | After 4 weeks | After 5 weeks | Change rate (%) |
|---|---|---|---|---|---|---|---|---|
| Examples | 1 | 84000 | 80000 | 82000 | 81000 | 83000 | 83000 | −1.2 |
|  | 2 | 50000 | 48000 | 49000 | 50000 | 51000 | 51000 | 2.0 |
|  | 3 | 90000 | 90000 | 89000 | 89000 | 90000 | 91000 | 1.1 |

TABLE 7-continued (test results 3)

| | | Emulsion 3 (mPa · s) | | | | | |
|---|---|---|---|---|---|---|---|
| | | As-produced | After 1 week | After 2 weeks | After 3 weeks | After 4 weeks | After 5 weeks | Change rate (%) |
| | 4 | 92000 | 90000 | 92000 | 91000 | 91000 | 90000 | 2.2 |
| | 5 | 80000 | 78000 | 79000 | 80000 | 79000 | 79000 | −1.3 |
| | 6 | 86000 | 82000 | 83000 | 85000 | 86000 | 88000 | 2.3 |
| Comparative | 1 | 78000 | 77000 | 78000 | 77000 | 78000 | 77000 | −1.3 |
| Examples | 2 | 82000 | 81000 | 80000 | 81000 | 82000 | 83000 | 1.2 |
| | 3 | 88000 | 87000 | 86000 | 86000 | 87000 | 87000 | −1.1 |
| | 4 | 7000 | 6800 | 6900 | 7000 | 7100 | 7100 | 1.4 |
| | 5 | 13000 | 12500 | 12000 | 12000 | 12500 | 12500 | −3.8 |
| Blank | | 730 | 730 | 725 | 720 | 720 | 710 | 3.4 |

The viscosity of the as-produced products differs depending on the type of the viscosity modifier, but this causes no problem. The problem is associated with a change in viscosity with time. With resins including an aromatic ring (Emulsions 1 and 2), the difference between the examples and comparative examples is significant. The viscosity in the examples changes somewhat with time, but the change rate is eventually 6% or less in all of the examples. Meanwhile, regarding the comparative examples, the viscosity decreased continuously with time and the change rate was eventually above 10% in all of the comparative examples. By contrast, regarding the resin including no aromatic ring (Emulsion 3), the stability with time was good in the examples and comparative example, while the thickening function was maintained. These results indicate that the viscosity modifier composition of the present invention can be used as a viscosity modifier for a greater variety of emulsions as compared with the conventional viscosity modifiers.

The invention claimed is:

1. A viscosity modifier composition comprising a compound (A) represented by the following general formula (1) and a compound (B) represented by the following general formula (2) at a mass ratio (A)/(B) of from 70/30 to 95/5:

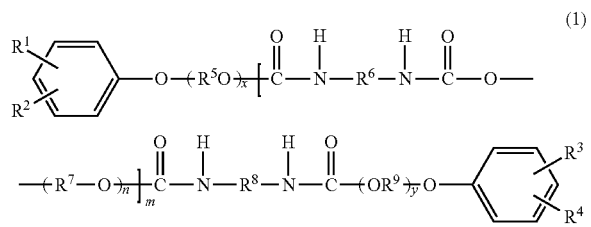

where $R^1$ to $R^4$ each represent a hydrogen atom, an alkyl group having 1 to 12 carbon atoms, or an aromatic hydrocarbon group having 6 to 15 carbon atoms, $R^5$ and $R^9$ each represent an ethylene group or a propylene group, $R^6$ and $R^8$ each represent a divalent saturated hydrocarbon group having 3 to 13 carbon atoms, $R^7$ represents an ethylene group, x and y represent a number from 0 to 50, n represents a number from 50 to 500, and m represents a number from 1 to 10,

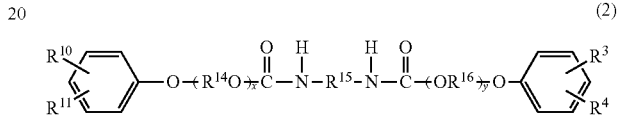

where $R^{10}$ to $R^{13}$ each represent a hydrogen atom, an alkyl group having 1 to 12 carbon atoms, or an aromatic hydrocarbon group having 6 to 15 carbon atoms, $R^{14}$ and $R^{16}$ each represent an ethylene group or a propylene group, $R^{15}$ represents a divalent saturated hydrocarbon group having 3 to 13 carbon atoms, and p and q represent a number from 3 to 50.

2. The viscosity modifier composition according to claim 1, wherein $R^6$ and $R^8$ in the general formula (1) and $R^{15}$ in the general formula (2) are each an alkylene group having 3 to 13 carbon atoms.

3. The viscosity modifier composition according to claim 1, wherein $R^1$ and $R^3$ in the general formula (1) and $R^{10}$ and $R^{12}$ in the general formula (2) are each an aromatic hydrocarbon group having 6 to 15 carbon atoms.

4. An emulsion composition comprising 0.1 parts by mass to 5 parts by mass of the viscosity modifier composition according to claim 1 with respect to 100 parts by mass of an emulsion.

5. The emulsion composition according to claim 4, wherein the emulsion comprises a resin including at least 20% by mass of a unit derived from styrene.

6. A water-based paint composition comprising 0.1 parts by mass to 5 parts by mass of the viscosity modifier composition according to claim 1 with respect to 100 parts by mass of a water-based paint.

7. The water-based paint composition according to claim 6, wherein the water-based paint comprises a resin including at least 20% by mass of a unit derived from styrene.

8. The viscosity modifier composition according to claim 2, wherein $R^1$ and $R^3$ in the general formula (1) and $R^{10}$ and $R^{12}$ in the general formula (2) are each an aromatic hydrocarbon group having 6 to 15 carbon atoms.

9. An emulsion composition comprising 0.1 parts by mass to 5 parts by mass of the viscosity modifier composition according to claim 2 with respect to 100 parts by mass of an emulsion.

10. An emulsion composition comprising 0.1 parts by mass to 5 parts by mass of the viscosity modifier composition according to claim 3 with respect to 100 parts by mass of an emulsion.

11. An emulsion composition comprising 0.1 parts by mass to 5 parts by mass of the viscosity modifier composition according to claim 8 with respect to 100 parts by mass of an emulsion.

12. The emulsion composition according to claim 9, wherein the emulsion comprises a resin including at least 20% by mass of a unit derived from styrene.

13. The emulsion composition according to claim 10, wherein the emulsion comprises a resin including at least 20% by mass of a unit derived from styrene.

14. The emulsion composition according to claim 11, wherein the emulsion comprises a resin including at least 20% by mass of a unit derived from styrene.

15. A water-based paint composition comprising 0.1 parts by mass to 5 parts by mass of the viscosity modifier composition according to claim 2 with respect to 100 parts by mass of a water-based paint.

16. A water-based paint composition comprising 0.1 parts by mass to 5 parts by mass of the viscosity modifier composition according to claim 3 with respect to 100 parts by mass of a water-based paint.

17. A water-based paint composition comprising 0.1 parts by mass to 5 parts by mass of the viscosity modifier composition according to claim 8 with respect to 100 parts by mass of a water-based paint.

18. The water-based paint composition according to claim 15, wherein the water-based paint comprises a resin including at least 20% by mass of a unit derived from styrene.

19. The water-based paint composition according to claim 16, wherein the water-based paint comprises a resin including at least 20% by mass of a unit derived from styrene.

20. The water-based paint composition according to claim 17, wherein the water-based paint comprises a resin including at least 20% by mass of a unit derived from styrene.

* * * * *